United States Patent [19]
Lindsay, Jr.

[11] Patent Number: 6,068,206
[45] Date of Patent: May 30, 2000

[54] FILM WEB MOTION CONTROL SYSTEM

[75] Inventor: Kenneth Alan Lindsay, Jr., Brockport, N.Y.

[73] Assignee: Eastman Kodak Company, Rochester, N.Y.

[21] Appl. No.: 08/780,196

[22] Filed: Jan. 10, 1997

Related U.S. Application Data

[63] Continuation of application No. 08/453,698, May 30, 1995, abandoned.

[51] Int. Cl.[7] .............................. B65H 59/38; G11B 15/46
[52] U.S. Cl. ...................................... 242/334.3; 242/334.2; 360/71
[58] Field of Search ............................... 242/334.3, 334.4, 242/334.2, 334.6; 360/71, 73.01; 318/7

[56] References Cited

U.S. PATENT DOCUMENTS

| | | | |
|---|---|---|---|
| 3,914,668 | 10/1975 | Okamoto | 242/352.1 X |
| 3,982,160 | 9/1976 | Goldschmidt et al. | 242/334.4 X |
| 4,012,134 | 3/1977 | Silver et al. | 353/26 R |
| 4,126,817 | 11/1978 | Luzio | 318/7 |
| 4,696,439 | 9/1987 | Sukigara et al. | 242/334.2 |
| 4,801,853 | 1/1989 | Lewis et al. | 318/7 |
| 4,989,112 | 1/1991 | Hamoda | 242/334.4 X |
| 5,039,027 | 8/1991 | Yanagihara et al. | 242/190 |
| 5,275,351 | 1/1994 | Wu et al. | 242/334.4 |

FOREIGN PATENT DOCUMENTS

| | | |
|---|---|---|
| 349307 | 3/1979 | Austria . |
| 0 594 373 | 4/1994 | European Pat. Off. . |
| 43 02 189 | 7/1994 | Germany . |

OTHER PUBLICATIONS

Patent Abstracts of Japan, vol. 16, No. 83 (M–1215), Feb. 27, 1992 and JP–A–03 264358 (Nireco), Nov. 25, 1991.

Primary Examiner—John Q. Nguyen
Attorney, Agent, or Firm—Frank Pincelli

[57] ABSTRACT

A web motion control system for controlling the tension in a web advanced at a preset velocity in a web transport path between a supply reel and a take-up reel without the use of tension loops, particularly for use in transporting spliced together, developed filmstrips through a film preparation work station. The web (film) is advanced in the web transport path in either a forward or rewind direction in either a velocity mode or a position mode by a motor driven capstan roller. The supply and take-up reels have a hub over which the web is wound in unknown supply and take-up web winding diameters. Take-up and supply reel motors and encoders are attached to the take-up and supply reels for imparting torques to the reels in response to motor torque signals to prevent slack in the film segments between the reels and the capstan roller and to provide reel encoder output signals on at least each 360° rotation of the reels. A metering encoder rotated with the capstan roller is employed to develop an encoder count signal. The web winding radii are calculated from the differential encoder counts at successive reel encoder output signals, and appropriate motor torque signals are developed. The encoder count is also employed in the position mode to control the stopping of the web after a predetermined advancement.

9 Claims, 6 Drawing Sheets

FILM WEB MOTION CONTROL SYSTEM

This is a Continuation of application Ser. No. 08/453,698, filed May 30, 1995, abandoned.

CROSS-REFERENCE TO RELATED APPLICATIONS

Reference is hereby made to commonly assigned, co-pending U.S. patent application Ser. No. 08/171,582 filed Dec. 23, 1993, for FILM PROCESSING SYSTEM in the names of Francis C. Long, et al, incorporated by reference herein in its entirety.

FIELD OF THE INVENTION

The present invention relates to a web motion control system for controlling the tension in a web advanced in a web transport path between a supply reel and a take-up reel without the use of tension loops, and more particularly to such a system as disclosed in the above-incorporated '582 application for use in transporting spliced together, developed filmstrips through a film preparation work station.

DESCRIPTION OF THE BACKGROUND ART

A film preparation work station described and depicted in the above-incorporated '582 application is depicted in FIG. 1. An elongated film comprising spliced together developed filmstrips that have been separated from their cartridges is loaded into a film preparation work station 132. The work station 132 checks splice integrity, cleans the film and electronically scans the film to capture information used during the printing of both service prints (optical prints of developed images from the film onto photographic paper) and index prints. The work station is mechanically independent of associated service and index printers described in the '582 application.

The work station 132 includes supply and take-up reels 142 and 144, respectively, including appropriate drives and drags for removing slack and maintaining slight tension at the beginning and end of the film line. Film is unwound from its spliced roll 146 at supply reel 142, moves through a substantially straight line path 148, through a series of operating stations, and is wound up again into a reverse roll 150 at take-up reel 144. A metering roller 152 pulls the film along the straight line path around a capstan 154 and through the operating stations at a constant and controlled speed. In this Figure, the metering roller 152 and capstan roller 154 are shown schematically and not necessarily in the actual positions when implemented. The first station after roller 154 is a splice/perforation detector 156 that checks the integrity of the splices between the film strips and detects film perforations. A staple detector may also be included. Next is a film cleaner 158 for removing dust particles that would decrease the accuracy of the image scanning. A series of electronic scanning devices 160, 162 and 164 read or capture information from the film. A second splice detector 166 is positioned in this same series. The first electronic device 160 is an optional transducer called a film code reader (FCR). It captures a film identification (FID) that is applied as a latent image bar code (LIBC) when the film is manufactured. This latent image code is developed in the film processor 130, after which it is machine readable. The film identification is the same as the cartridge identification (CID), also applied as a machine readable bar code at the time of manufacture. The film identification (FID) captured here is printed on the back of each service and index print in subsequent printer operations.

The film code reader (FCR) 160 also identifies the beginning of each film strip, establishes the location of each image frame using the mark or perforation mentioned earlier in connection with the APS format, and looks for a FAT bit as described later in this section.

A magnetic read head assembly 162 that reads magnetically recorded information from a magnetics-on-film (MOF) layer of the individual filmstrips is positioned in the film transport path between the FCR 160 and the second splice detector 166. Some cameras using a film format as described further in the above-incorporated '582 application will record a variety of information in tracks of the MOF layer representing certain exposure conditions. Other pre-recorded information may be present in other tracks, and information related to the processing and printing event may be recorded in other tracks. Such filmstrips and the various types of magnetically recorded information, including the use or reproduction of the recorded information during film processing, are also described in commonly assigned U.S. Pat. No. 4,977,419.

Other cameras will not have magnetic recording capability but may have a capability for recording image format information, e.g. normal and panoramic format. Such image format information will be exposed on the individual filmstrip for that camera film as a latent bit referred to as a "FAT" bit. The information represented by the presence or absence of a FAT bit is captured in the work station by the FCR 160.

Station 164 includes an opto-electronic transducer or array scanner for electronically scanning and capturing representations of the developed images from the film. The electronic image representations are used to determine appropriate transfer densities and color correction factors for a service printer and for generating index prints in an index printer. The array scanner views the film through a full width slit while the film is pulled continuously over the slit by metering roller 152.

The magnetic read head assembly 162, when engaged, imposes drag on the film because the magnetic head or heads must make intimate contact with the MOF layer in order to accurately read out the information recorded in one or more tracks. The optically transparent MOF layer has a low magnetic particle density that requires such high head compliance, which creates the drag. Although not shown, it will be understood that a further MOF write head assembly may also be used in the film preparation work station positioned between the metering roller 152 and the take-up reel 144. In MOF read head assemblies 162 and write head assemblies considered for use in the film preparation work station, the drags imparted to the film vary from 9–11 oz.

The transport of such films through such a film preparation work station 132 is conducted at a steady velocity to accommodate the image frame scanning and MOF layer read out and recording. The film is longitudinally stiff and not subject to stretching. However, it can jam or break. Moreover, the movement of the supply and take-up reels 146, 144 tends to be uneven as the film may not wind uniformly on the reel hubs due to the intermittent splices.

In use of the film preparation work station 132, it is desired to be able to accurately move or advance the film at a constant velocity in either the forward direction or the rewind direction and to effect positioning of the film to a desired start position from any current position. In this process, imbalances in the tensions on the film must be minimized. A first tension appears on movement of the film in the film length between the supply reel and the metering roller, and a second tension appears on movement of the film in the film length between the metering roller and the take-up reel. As described further below, in the absence of correction, the first and second tensions are not equal and vary.

In the past, a wide variety of reel-to-reel web transport systems have been proposed for webs of various materials including paper, magnetic tape, motion picture film and spliced-together filmstrips. Control of tension in the web is of importance in a variety of contexts. A common approach involves the use of variable length, tension loops as disclosed in U.S. Pat. No. 5,039,027, for example, for measuring tension between a metering roller and the supply and take-up reels. The use of such tension loops is particularly useful in controlling web tension during acceleration and deceleration in a single direction of web transport.

Problems to be Solved by the Invention

Such tension loops complicate the threading of webs from the supply to the take-up reel. It is desirable to provide simple automatic threading of the web or film between the supply and take-up reels. Traditional tension loops are overly complex, requiring three additional idler rollers, springs, bearings and feedback devices, such as potentiometers. A servo loop is typically required for maintaining constant tension in these loops and it is difficult to stabilize over a wide range of differing film sizes (e.g. 35 mm and 24 mm), film cores and winding diameter inertias. In addition, the mechanism that would be required to compensate for tension drops due to the drags imposed by additional devices in the film transport path would be overly complex and expensive.

SUMMARY OF THE INVENTION

It is therefore and object of the present invention to provide a web tension control system that avoids the use of tension loops and is simple to automatically thread with the web.

It is a further object of the invention to provide such a system which may be used in transporting films of the type described above through a filmstrip preparation work station.

These and other objects of the invention are realized in a web motion control system for controlling the tension in a web advanced in a web transport path between a supply reel and a take-up reel at a constant velocity in either a forward or rewind direction, the supply and take-up reels having a hub over which the web is wound in unknown supply and take-up web winding diameters, comprising: metering means for engaging the web in the transport path between the supply reel and the take-up reel and for advancing the web between the supply reel and the take-up reel in response to a forward or a rewind metering motor drive signal; means for providing metering signals at predetermined fractional amounts of advancement of the web; counting means for counting the metering signals as a count; supply torque means responsive to a supply torque signal for imparting a supply tension on the web extending between the supply reel and the metering means for countering any slack in the web; a supply reel encoder for providing a supply interrupt signal at least once during each full rotation of the supply reel; take-up torque means responsive to a take-up torque signal for imparting a take-up tension on the web extending between the take-up reel and the metering drive roller for countering any slack in the web; a take-up reel encoder for providing a take-up interrupt signal at least once during each full rotation of the take-up reel; and tension control means responsive to the metering signals and the supply and take-up interrupt signals only for providing the supply and take-up torque signals and maintaining a constant tension on the web between the supply and take-up reels at the predetermined rate of rotation in the forward or rewind direction.

More particularly, the system employs a metering capstan roller for advancing the web between the supply reel to the take-up reel under the influence of a metering drive motor; a metering drive encoder for providing metering signals at predetermined fractional degrees of rotation of the metering drive motor shaft; counting means for counting the metering signals as a running count; a supply reel torque motor coupled to the supply reel and responsive to a supply motor torque signal for applying a supply reel torque thereto to impart a supply reel tension on the web extending between the supply reel and the metering drive roller; a supply reel encoder for providing a supply interrupt signal at least once during each full rotation of the supply reel; a take-up reel torque motor coupled to the take-up reel and responsive to a take-up motor torque signal for applying a take-up reel torque thereto to impart a take-up reel tension on the web extending between the take-up reel and the metering drive roller; and a take-up reel encoder for providing a take-up interrupt signal at least once during each full rotation of the take-up reel.

Preferably, the tension control means further comprises: first means responsive to successive supply interrupt signals for determining successive supply counts of the counting means and from the successive supply counts providing a first difference count correlated to the advancement of a web segment length equal to the circumference of the supply web winding; second means for calculating the supply web winding diameter of the web wound on the supply reel hub from the first difference count; third means responsive to the calculated supply web winding diameter for calculating the magnitude of a supply torque signal sufficient to apply a first predetermined tension on the web between the metering roller and the supply reel;

fourth means responsive to successive take-up interrupt signals for determining successive take-up counts of the counting means and from the successive take-up counts providing a second difference count correlated to the advancement of a second web segment length equal to the circumference of the take-up web winding; fifth means for calculating the take-up web winding diameter of the web wound on the take-up reel hub from the second difference count; sixth means responsive to the calculated take-up web winding diameter for calculating the magnitude of a take-up torque signal sufficient to apply a second predetermined tension on the web between the metering roller and the supply reel; whereby the tensions in the web are equalized.

Moreover, the supply torque means is responsive to the supply torque signal for imparting a supply tension on the web extending between the supply reel and the metering means in opposition to the forward direction and in the rewind direction of advancement of the web; and the take-up torque means is responsive to the take-up torque signal for imparting a take-up tension on the web extending between the take-up reel and the metering drive roller in the forward direction and in opposition to the rewind direction of advancement of the web.

As described above, the web is preferably a length of spliced together exposed filmstrips, and the system is employed in a film preparation work station where the film is subjected to a drag or drags by other equipment located in the film transport path.

Advantages of the Invention:

The invention advantageously avoids the use of variable length tension loops while maintaining tight control of web and filmstrip tension. At the predetermined rate of rotation of the metering capstan roller, the first and second predetermined tensions imparted to the web are equalized and web advancement velocity is dependant on the predetermined rate of rotation of the metering drive roller.

BRIEF DESCRIPTIONS OF THE DRAWINGS

These and other objects, advantages and features of the invention will become apparent from the detailed description given hereinafter in relation to the accompanying drawings, in which.

DETAILED DESCRIPTION OF THE PREFERRED EMBODIMENTS

Figure 1:
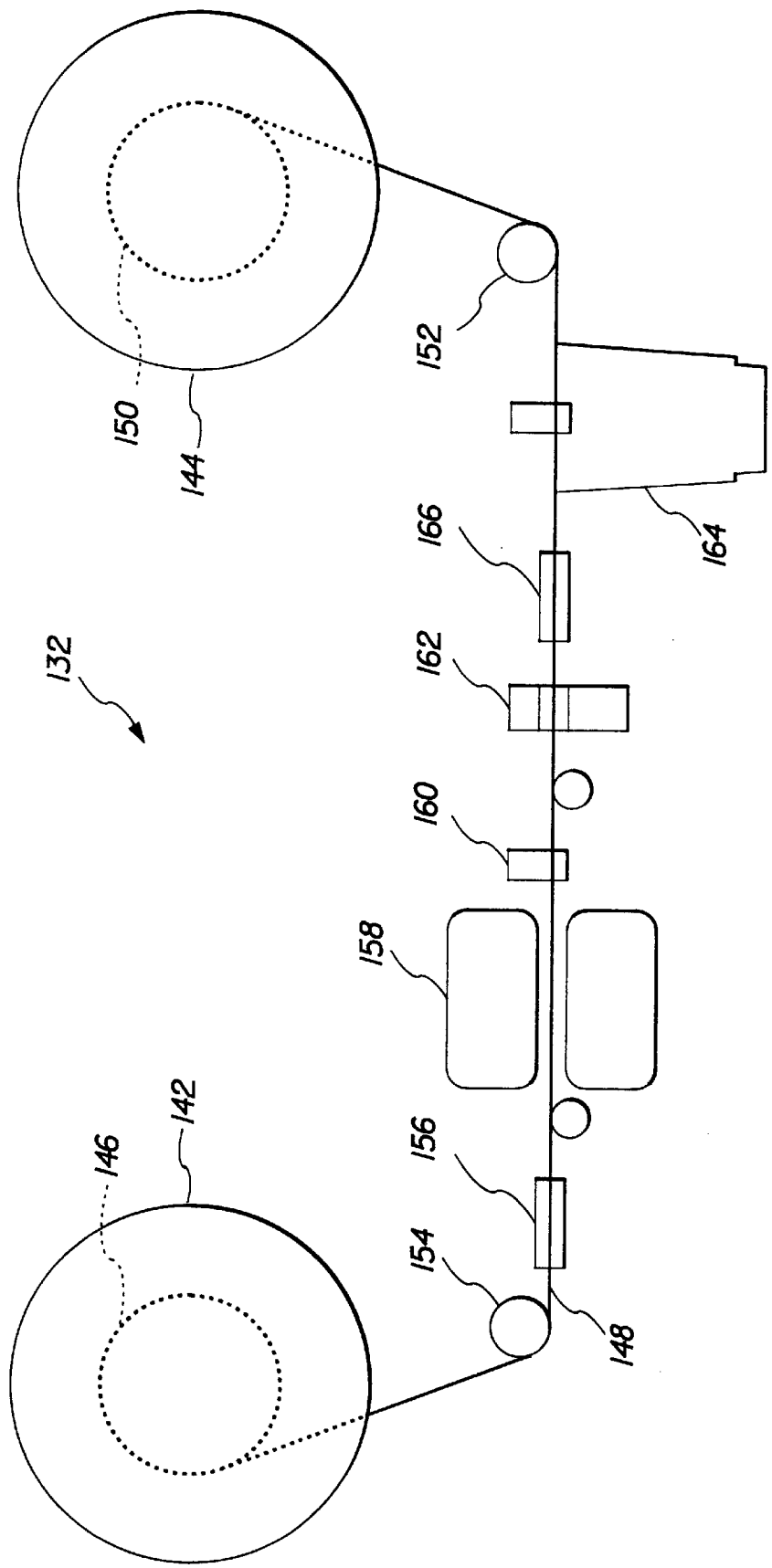
FIG. 1 is a block diagram of a film preparation work station in which the present invention may be implemented.
Figure 2:
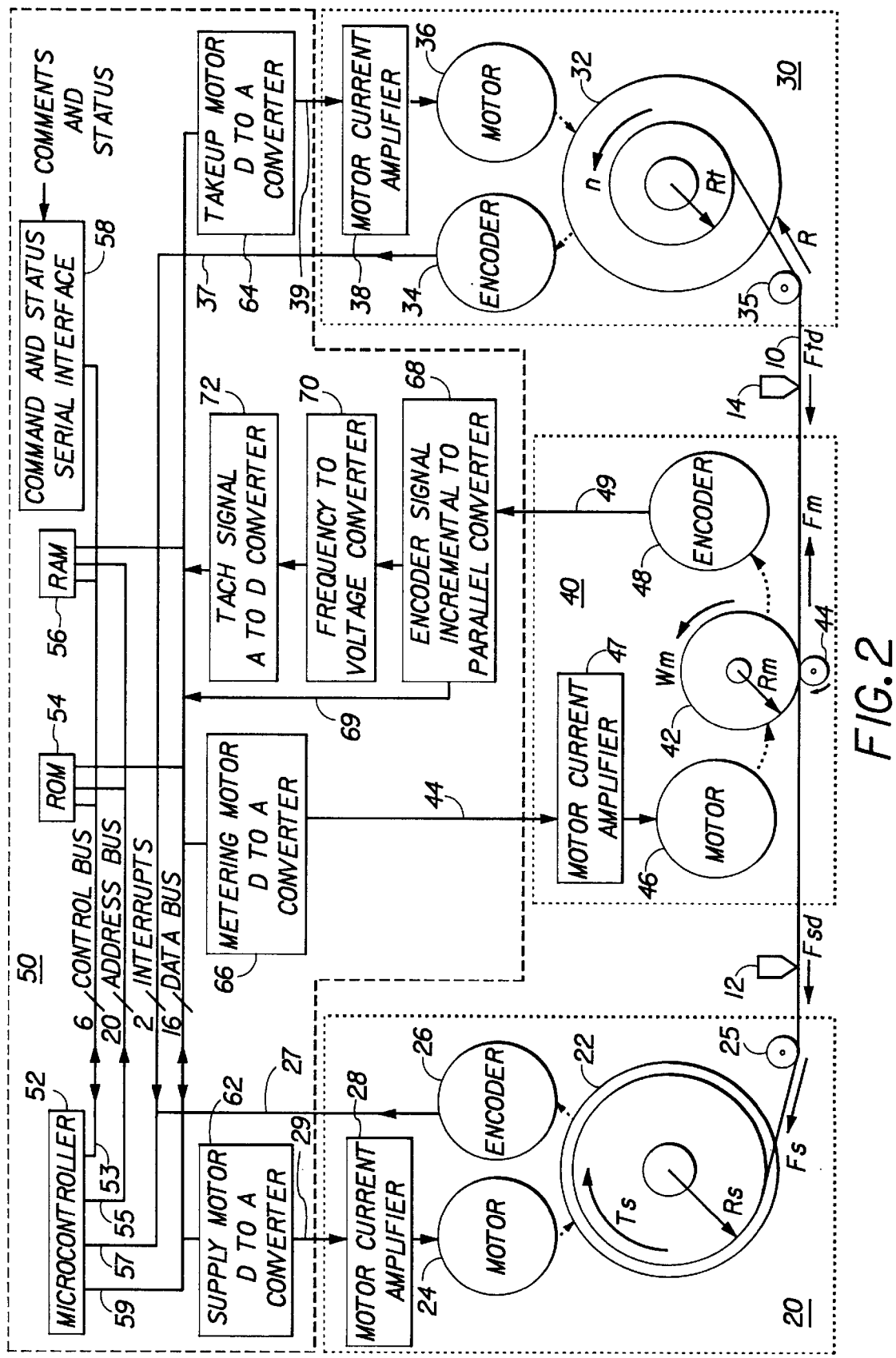
FIG. 2 is a schematic block diagram of the film motion control system of the present invention for controlling the tension in the film during its transported through the film preparation work station.

Turning now to FIG. 2, a motion control system for controlling the tension in a web, e.g. the film 10 advanced in a film transport path between a supply reel 22 of a supply reel drive assembly 20 and a take-up reel 32 of a take-up reel drive assembly 30 at a constant velocity in either a forward or rewind direction is depicted. The other components of the film preparation work station 132 of FIG. 1 that are in the film transport path are not depicted in FIG. 2. It will also be understood that the other operations of the film preparation work station 132 than the film transport described hereafter are controlled by a host computer that interfaces with the motion control system.

The film advance in the forward and rewind directions of transport is effected by the metering drive assembly 40 which is driven by the motion control electronics assembly 50 in the counter-clockwise and clockwise directions, respectively. The motion control electronics assembly 50 receives commands and status signals from the film preparation work station operating system as well as supply and take-up interrupt signals from supply and take-up reel drive assemblies 20 and 30 and metering signals from metering drive assembly 40. These signals are processed by the motion control electronics assembly 50 which provides metering motor drive signals to the metering drive assembly 40 to advance the film 10 at a predetermined velocity and provides supply and take-up metering torque signals to the supply and take-up reel drive assemblies 20, 30 to apply upstream and downstream tension in opposing directions to counter drag on the film imparted by upstream and/or downstream drag imposing devices 12 and 14 (i.e., the MOF read and write head assemblies). In steady state operation, at the predetermined velocity, the opposing upstream tension Fs and downstream tension Ft applied by the supply and take-up reel drive assemblies 20, 30 are equalized and overcome the upstream drag Fsd and downstream drag Ftd on the film 10. In this state, the film 10 is advanced solely by the operation of the metering drive assembly 40.

The metering drive assembly 40 (corresponding to metering roller 152 in FIG. 1) includes a metering capstan roller 42 and an opposing pinch roller 44 for engaging the film 10 in their nip. The metering drive current motor 46 receives a metering drive current from the motor current amplifier 47 which converts and amplifies an input voltage received on line 45 at a gain of 1.0 amps/volt. A metering encoder is also attached to the capstan roller shaft and provides 8,192 pulses per rotation on metering signal line 49. The encoder 48 preferably is a 90° quadrature encoder that provides phased output pulses that can be discriminated to determine the direction of rotation of the capstan roller 42. The film 10 is relatively inelastic, and slippage is minimal in the absence of jams. Consequently, a differential count of the metering encoder pulses represents the amount of film passed through the nip, and the phase represents the direction of film transport.

The supply reel drive assembly 20 includes the supply idler 25 for guiding the film 10 and supply reel 22 having a known hub radius and a length of film 10 wound on it in a supply web winding diameter of 2Rs. The shaft of supply reel 22 is coupled to the shaft of supply reel torque motor 24 and to supply reel encoder 26. Supply reel torque motor 24 is also a current motor and receives a current from motor current amplifier 28. Current amplifier 28 converts and amplifies an input voltage representing a supply motor torque signal received on line 29 at a gain of 0.5 amps/volt.

The supply reel motor 24 is operable in both directions under the control of an appropriate supply motor torque signal for applying torque Ts in opposition to the forward direction of film advance (as shown in FIG. 2) or with the rewind direction of film advance. In either direction, the supply reel encoder 26 provides at least one, and preferably eight, supply interrupt pulses on supply encoder interrupt line 27 with each full rotation of supply reel 22 through 360°.

The take-up reel drive assembly 30 is configured and operates similarly and includes the take-up idler 35 for guiding the film 10 and the take-up reel 32 having a known hub radius and a length of film 10 wound on it in a take-up web winding diameter of 2Rt. The shaft of take-up reel 32 is coupled to the shaft of take-up reel torque motor 34 and to encoder 36. Take-up reel torque motor 34 is also a current motor and receives a current from motor current amplifier 38. Current amplifier 38 converts and amplifies an input voltage representing a take-up motor torque signal received on line 39 at a gain of 0.5 amps/volt.

The take-up reel motor 34 is operable in both directions under the control of an appropriate take-up motor torque signal for applying torque Tt in the forward direction of film advance (as shown in FIG. 2) or against the rewind direction of film advance. In either direction, the take-up reel encoder 36 provides at least one, and preferably eight, take-up interrupt pulses on take-up encoder interrupt line 37 with each full rotation of take-up reel 32 through 360°.

The motor control electronics assembly 50 includes a microcontroller 52, e.g. a Motorola® 68HC16 16-bit microcontroller, with supplemental RAM 54 and ROM 56 for operating the web or film motion control system employing resident software. A control bus 53 and an address bus 55 interconnect the microcontroller 52 with the RAM 54 and ROM 56. A command and status serial interface 58 receives and communicates external status reports and operational commands from the host computer of the film preparation work station. The interface 58 may be a differential, EIA-422-78 compatible, transmitter for transmitting status reports to the host computer and receiver for receiving operating commands from the host computer configured as a DCE.

The overall operation of the film motion control system of FIG. 2 is effected by commands from the microcontroller 52 distributed to the sub-systems on control bus 53 in response to operating commands received from the host computer. The received operating commands may include the Mode Select commands which include the velocity mode which, in conjunction with a velocity limit, sets the direction and velocity limit of film advance and the position mode which, in conjunction with a position offset, establishes the direction and a metering interrupt count governing a distance that the film is to be advanced. The Velocity Limit operating command itself defines the direction and film advance velocity to be maintained in the velocity mode and the maximum velocity in the position mode. The Position Offset operating command defines the distance and direction of film advance and is expressed in metering encoder pulses. Other operating commands include the Go, Stop, Reset, Restart and various Configuration commands. Generally, a Go command follows a Mode Select command and a Velocity Limit and/or Position Offset Command to start film advance. Film advance is halted in the Velocity Mode by a Stop command and in the Position Mode by achievement of the Position Offset. The Reset and Restart commands stop and disable the reel and metering motors and cause the film to go slack. The Reset and the Restart commands emulate software and hardware resets of the microcontroller. Both the Reset and Restart commands clear command and interface errors.

The status reports typically request a transmission out of status conditions or modes of the film motion control system as monitored by the microcontroller 52. For example, the microcontroller 52 may be requested to transmit out a Mode Read of the previously set operational mode, a Velocity Read of the previously commanded Velocity Limit, a Position Read of the amount of film metered in response to a previous Position Offset command in the position mode, a current operational system status or error code, and diagnostic codes and values related to diagnostic routines. In addition, a Status Request commands the return of a status code indicating simply the current status or an error code.

Error codes may be generated from the signals processed by the microcontroller 52 or by the sub-systems under its control. As one example, the eight supply and take-up interrupt pulses generated during each full rotation of the supply and take-up reel encoders 26 and 36 are processed and compared to limits when the film 10 is being advanced to determine when the film 10 is either jammed (a stopped reel) or is broken (a runaway reel). In response to such an error, the microcontroller 52 will halt the film advance and transmit the specific error code out to the host computer.

Returning to the film motion control system, it is not necessary to further explain all of these operating and status commands or reports and the system response to gain an understanding of the invention. The commands and reports used in the practice of the invention are referred to hereafter as necessary.

Within the film motion control system, microcontroller 52 receives the supply and take-up interrupt pulses from supply and take-up encoders 26 and 36 on interrupt bus 57 which is connected to lines 27 and 37. The data bus 59 is interconnected between the microcontroller 52, RAM 54, ROM 56, a supply motor D/A converter 60, take-up motor D/A converter 62, metering motor D/A converter 66, encoder signal incremental-to-parallel converter 68 that generates an encoder_count signal on encoder position signal line 69, and Tach_Signal A/D converter 72. Converter 68 is also coupled to frequency to voltage converter 70 which is coupled in turn to Tach_Signal A/D converter 72.

Metering motor D/A converter 66 converts a digital word representing a film velocity error or a position error signal to an analog voltage and applies it to the motor current amplifier 47. The metering motor drive signal current is applied to the metering motor 46 to rotate the metering capstan motor 46 in the appropriate direction. In FIG. 2, film advance in the forward direction from supply reel 22 to take-up reel 32 is depicted, and so the applied metering drive signal current causes the capstan roller 42 to rotate in the direction Wm to advance the film 10 from left to right.

As the supply and take-up reels 22 and 32 and the capstan roller 42 rotate, the encoders 26 and 36 generate the supply and take-up interrupts at each fractional rotation (each 45° rotation in the case of eight encoder output signals per 360° rotation) of the reels 22 and 32, respectively. At the same time, the quadrature, encoder output pulses of metering encoder 48 are applied to encoder signal incremental-to-parallel converter 68 which provides the encoder_count signal on line 69 to the data bus 59 and passes the encoder output signals to the frequency to voltage converter 70 as constant width pulses.

The constant width pulses outputed from the converter 70 are applied to the Tach_Signal A/D converter 72 to provide a digital word Tach_Signal representing the rate of rotation of the metering capstan roller 42 which is supplied via data bus 59 to the microcontroller 52. The Tach_Signal magnitude is a function of the duty cycle of the fixed pulse width which increases with the rate of rotation of the capstan roller 42 which in turn sets the velocity of the film 10. The Tach_Signal is used in a feedback loop to stabilize the servo operation depicted in FIG. 3.

The encoder-count signal is generated in a 16-bit up/down counter in converter 68. The count is incremented or decremented depending on the direction of film transport which in turn is reflected by the phase of the quadrature metering encoder pulses. The starting count is set by the microcontroller 52, and the count is sampled by microcontroller 52 at a sampling frequency that governs the recalculation of current words to the supply and take-up motor D/A converters 62 and 64 and the metering motor D/A converter 66 in the Velocity and Position Modes.

Figure 3:
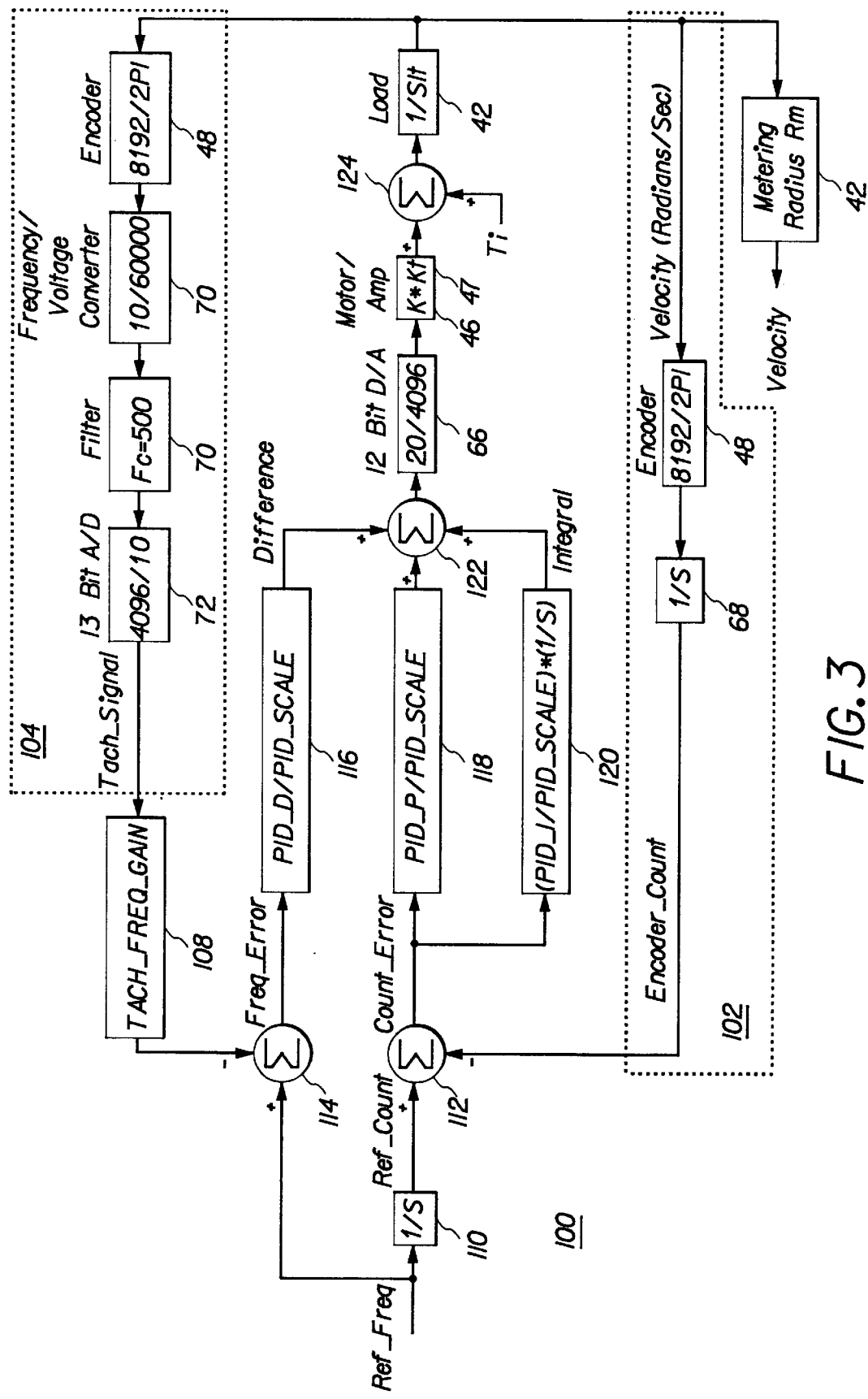
FIG. 3 is a film motion control servo diagram of the servo loop control of the metering drive assembly of FIG. 2.

Turning now to FIG. 3, it is a film motion control servo diagram 100 illustrating the servo loop control effected by the film motion control system governing film velocity and direction in either the Velocity Mode or the Position Mode. The servo control is based on a proportional integral and differential, PID, error signals operation, to impart an output force to the filmstrip 10 through the metering capstan roller radius Rs as defined by the Ref_Freq input and subsequent errors, if any. When the film is being held stationary, the Ref_Freq input will be at zero. The Ref_Freq will be at the Velocity Limit command at speed and at changing values when the state of the system is being changed in the Velocity or Position Modes as described below with reference to FIGS. 4–6. Tension Imbalances Ti are compensated for by closed feedback loops as also described below.

In FIG. 3, certain of the blocks are numbered with the equivalent components of FIG. 2 where the depicted functions take place, and other numbered block functions are carried out in microcontroller 52. Feedback signal processing with the Ref_Freq input signal in accordance with the film motion control servo diagram 100 is undertaken in the microcontroller 52.

In general, the feedback loop 102 provides the encoder_count as the integral of the encoder pulses which vary in frequency with the velocity in radians/second of the metering roller. The encoder_count is summed at 112 with the integral Ref_Count product of the Ref_Freq input at block 110 to provide the Count_Error output. The feedback loop 104 provides the Tach_Signal at the output of the Tach_Signal A/D converter 72 to be gain adjusted in block 108 and summed at 114 with the Ref_Freq input to provide the Freq_Error output. The Freq_Error signal is multiplied by the constant value of block 116 to scale the signal. The Count_Error output is multiplied by the constant value of block 118 to scale the signal and is also multiplied and integrated in block 120. The error signals of blocks 116, 118 and 120 are summed at 122 and applied to the 12-bit D/A converter 66 to derive the metering current to drive the metering motor 46.

The effect of the metering current, which is converted to torque by the motor 46, is to compensate or counteract for the summed tension imbalances Ti. The servo diagram 100 is independent of the operations of the system in establishing the torques Ts and Tt.

Figure 4:
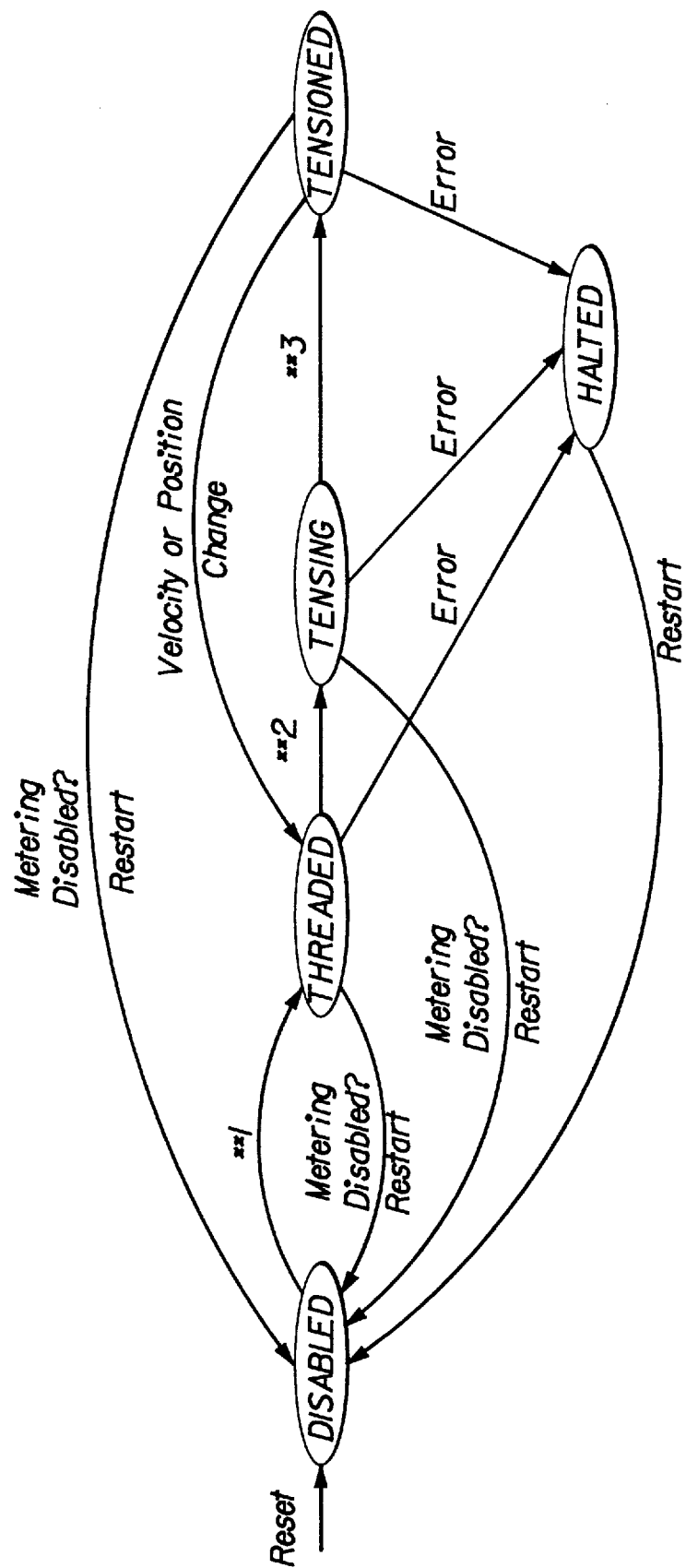
FIG. 4 is a state diagram of the reel state transitions of the supply and take-up reel assemblies of FIG. 2.
Figure 5:
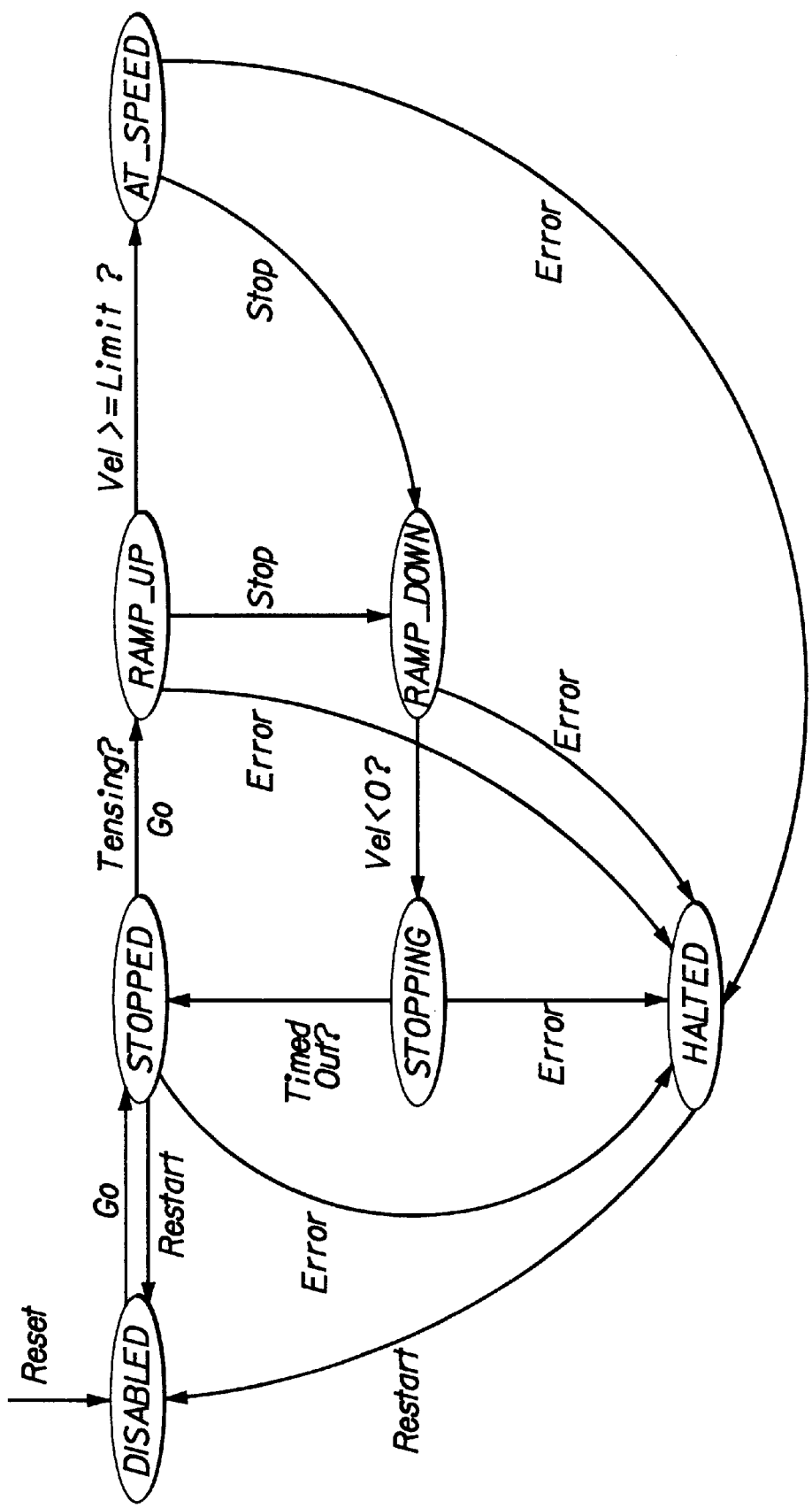
FIG. 5 is a state diagram of the velocity mode state transitions of the film motion control metering assembly sub-system of FIG. 2.
Figure 6:
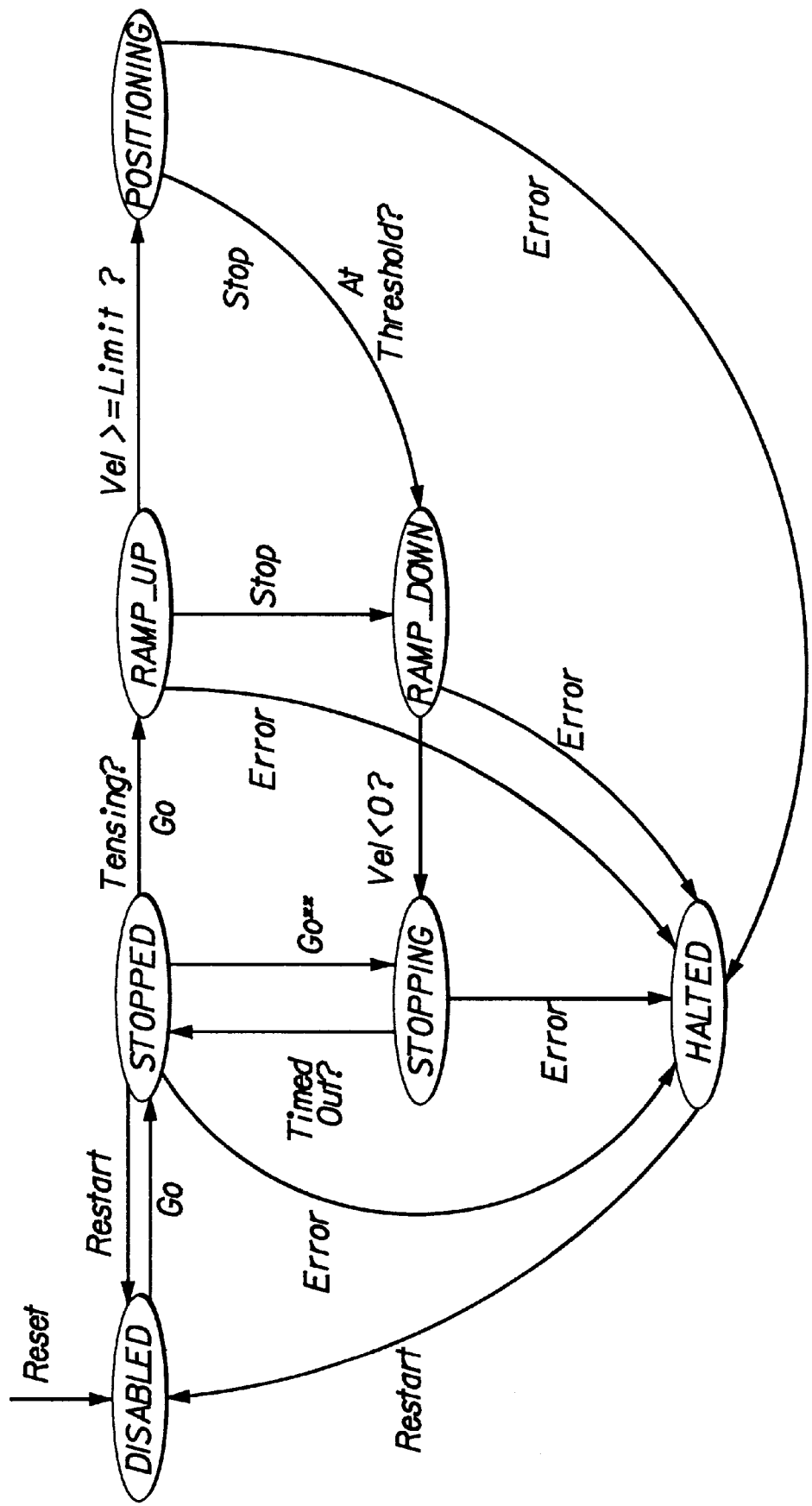
FIG. 6 is a state diagram of the position mode state transitions of the film motion control metering assembly sub-system of FIG. 2.

Turning to FIGS. 4–6, they reflect state changes of the film motion control system of the present invention illustrating reel state transitions in FIG. 4, the Velocity Mode in FIG. 5 and the Position Mode in FIG. 6. The reel state diagram of FIG. 4 shows the states and transitions between DISABLED and TENSIONED that occur prior to and during RAMP_UP of film motion to reach a commanded Velocity Limit and the transition to HALTED on occurrence of an error. The Error Code is transmitted back to the host computer.

The Position Mode and Velocity Mode state diagrams show the states and transitions during RAMP_UP and RAMP_DOWN and the transition to HALTED on occurrence of an error. The DISABLED state is the start state entered on a Reset or Restart command, and the STOPPED state is a no motion state. An Error Code declared in any state other than the DISABLED state or the STOPPED state, causes the transition to the HALTED state. The STOPPING state is a state that allows the system to settle to the STOPPED state from the RAMP_DOWN state over a time out period.

In FIG. 5, in the Velocity Mode, and FIG. 6, in the Position mode, the system is first in the DISABLED state as a consequence of a Reset or Restart command or system power up. The operating mode command is provided. In both modes, a Velocity Limit command is necessary to set the film velocity that Ref_Freq reflects when it is fully incremented. In the Position Mode, a Position Offset value is necessary, from which a target offset count is derived for use in the RAMP_DOWN state. The Go command with the appropriate related commands for the particular mode causes the transition to the STOPPED state and stays there until the reel sub-system enters the TENSING or TENSIONED state.

Before describing these states, attention is directed to the return from the AT_SPEED and POSITIONING states. When the Velocity Limit is reached, the POSITIONING state of FIG. 6 or the AT_SPEED state of FIG. 5 is reached. In these states the Ref_Freq is at the Velocity _Limit and disturbances and imbalances that occur are accounted for. In the Position Mode, RAMP_DOWN state is entered at a count threshold that anticipates the final stopped position_offset value reflected in the encoder_count that matches the Ref_Count, whereby the Ref_Count is substituted with the position_offset value upon entering the STOPPING state, and the Ref_Freq value is held at zero. In the Velocity Mode, the film leader may be detected to commence RAMP_DOWN. RAMP_DOWN is effected in inverse fashion to RAMP_UP, and the distance traveled in RAMP_DOWN is directly related to the Velocity Limit and the rate of acceleration/deceleration.

With the state diagrams and the servo loop diagrams in mind, the microcontroller 52 operating in the Velocity or Position Mode with a Velocity Limit and/or a Position Offset is established by the operating command received on control bus 53. The Velocity Limit defines advancement of the film 10 in the forward or rewind direction. The initial DISABLED state of FIGS. 5 and 6 is maintained until the Go command, and the Ref_Freq at the input to the servo diagram 100 is at zero.

The microcontroller 52 is prepared to generate the Ref_Freq corresponding to the Velocity Limit command and to provide the appropriate metering motor drive signal as a digital word to metering motor D/A converter 66. However, prior to the generation of the metering motor drive signal, it is necessary to take up the slack in the film segments between the metering drive assembly 40 and the supply and take-up reel drive assemblies 20 and 30.

Returning to the reel state diagram of FIG. 4, in the DISABLED state, at **1, the microcontroller 52 first supplies starting supply and take-up motor torque digital word signals to the supply and take-up motor D/A converters 62 and 64. The supply and take-up motor D/A converters convert the starting torque digital words to analog voltages which are converted by the motor current amplifiers 28 and 38 to starting supply and take-up motor torque current signals. The supply and take-up motors 24 and 34 respond by establishing starting torques Tsi and Tti on reels 22 and 32 to pre-tension the film 10 so that slack in the film segments between the metering drive assembly 40 and the supply and take-up reel assemblies 20 and 30 is taken up. After this occurs, and a time delay times out, the reel state is in the THREADED state. The establishment of exemplary magnitudes of the starting supply and take-up motor torque digital word signals is described below.

From the THREADED state to the TENSING state at transition 2, the starting torques Tsi and Tti are incremented gradually to the default torques Tss and Tts for the initial default film winding radii as described below. The state then changes to the TENSIONED state at transition 3 after the torques are adjusted to Ts and Tt which reflect the film winding radii as determined in the manner described below. The reel state transitions 1 to 3 occur in harmony with the metering state changes of FIGS. 5 and 6.

Returning to FIGS. 5 and 6, in the STOPPED states, the metering current signal is essentially at zero so that the metering drive capstan roller 42 can be rotated freely by film movement. The supply and take-up motor torque current signals and the resulting torques Tss and Tts are in opposition to one another and are not in balance. Consequently, the film 10 commences to advance slightly in the direction of imbalance of the torques. As the film 10 advances in the direction of imbalance, it causes the metering encoder 48 to rotate and generate an encoder_count signal on the encoder position signal line 69. The direction of movement is detected through the feedback loops 102 and 106, and a metering motor drive current error signal is generated in response to counter the movement and restore the start position encoder_count. Film position is maintained, and the metering state is still STOPPED.

The metering state can transition from STOPPED to RAMP_UP when the reel TENSING (or TENSIONED) state is achieved. The metering motor drive current signal is then incremented sufficiently by increasing Ref_Freq from zero in increments. This causes the film 10 to commence advancement in the specified direction. The film velocity is accelerated toward the velocity limit at a predetermined rate of acceleration. As the film accelerates and advances, the torque Tts causes the take-up reel 32 to maintain tension as the film is being advanced by rotation of the metering capstan roller 42. At the same time, the torque Tss maintains tension to prevent slack in the film 10 while it is being advanced by the capstan roller 42. In the process, the rotation of the metering capstan roller 42 in response to the metering motor drive signal overcomes the drags Fsd and Ftd and the imbalances of Fts and Fss.

The following description addresses the calculation of the actual torques Tt and Ts from the calculation of the film winding radii on the supply and take-up reels in the TENSIONED reel state. First, the state changes can be commenced from a DISABLED state at the beginning of the advancement of a fresh roll of film almost entirely on the supply reel 22 or from a STOPPED state during the advancement of the film 10 between the supply and take-up reels 22 and 32. The amounts or lengths of film 10 wound on the supply and take-up reels are unknown as are the resulting supply and take-up web winding diameters on the reel hubs.

During the TENSING state, when the actual web or film winding radii are unknown, default values for supply and take-up reel radii Rsd and Rtd are assumed, and corresponding supply and take-up motor torque signals are provided to motors 24 and 34, respectively. The default value for the take-up reel radius Rtd may be selected to be that of the largest hub of any take-up reel expected to be used in the system. The default value of the supply reel radius Rsd may be selected to be double the smallest hub radius of the supply reels expected to be used in the system.

The radii of the unknown supply and take-up web windings must be determined and accounted for in the recalculation and application of sufficient supply and take-up motor torque signals to the supply and take-up reel torque motors 24 and 34 in the up-to-speed, predetermined, constant film velocity operating mode to prevent slack film segment loops from forming, leading to jams, or to prevent film breakage.

In order to compensate for the relative differences of the unknown supply and take-up web winding radii, the following process is undertaken (referencing the forces, torques and radii referenced in FIG. 2) as film speed reaches the Velocity Limit in POSITIONING or AT SPEED states of FIGS. 6 and 5, respectively. First, it will be understood that "Tension Balance" is achieved when the following relationships are achieved:

$$(Ft-Ftd)+Fm-(Fsd-Fs)=0;$$

or $$Fm=(Fs+Fsd)-(Ft-Ftd) \tag{1}$$

As described above, the upstream device 12 and downstream device 14 impose upstream drag Fsd and downstream drag Ftd on film 10 in the film segments between the metering drive assembly 40 and the supply reel drive and take-up reel drive assemblies 20 and 30, respectively. The upstream drag Fsd and downstream drag Ftd can be determined empirically from testing the devices 12 and 14 in use with films of each type intended to be used in the system, and this approach is preferred. Absent actual data for the upstream and downstream drags Fsd and Ftd, they can be assumed to equal +8 oz, and the following relationships are set equal to a nominal 16 oz of tension so that Fm=0 can be assumed:

$$16\ oz=(Fs+Fsd); \text{ if } Fsd=8 \text{ oz, then } Fs=8 \text{ oz} \tag{2}$$

$$16\ oz=(Ft-Ftd); \text{ if } Ftd=8 \text{ oz, then } Ft=24 \text{ oz} \tag{3}$$

In this equation, the polarities of the Fsd and Ftd values change from positive in the forward direction as depicted in FIG. 2 to negative in the rewind direction. Therefore, if the rewind direction of film transport were being considered, then the results would reverse such that Ft=8 oz and Fs=24 oz.

Since torque is related to force, then the torques Ts and Tt necessary to be supplied to the supply and take-up reels 22 and 32 can be related to the tensions Fs and Ft, respectively:

$$Ts=Fs/Rs \tag{4}$$

$$Tt=Ft/Rt \tag{5}$$

Next, it is possible to calculate the take-up web winding radius and the supply web winding radius from the measured length of film transported by one full supply and take-up reel revolution, respectively, which are referred to below as the "Supply Quantity" and the "Take-up Quantity", respectively. One full revolution (360°) is determined by an eight count of the encoder generated supply and take-up interrupt pulses. For simplification, it will be assumed that only every eighth supply and take-up interrupt pulse is considered in these calculations, and the single interrupt per revolution in each case is referred to as the "Supply Interrupt" and the "Take-up Interrupt".

To determine the Supply Quantity (SQ) and the Take-up Quantity (TQ), the number of encoder pulses outputted by metering encoder 48 is counted during each revolution of the supply and take-up reels 22 and 32. The Incrementally Advanced Quantity (IAQ) of the film 10 by the metering capstan roller 42 having a known radius Rm at each incremented metering signal is known from the relationship:

$$IAQ=2\pi Rm/8192 \tag{6}$$

The total Supply Quantity (SQ) and Take-up Quantity (TQ) are calculated from the Metered Quantity (MQ) of the metering signals generated between successive supply interrupt pulses and successive take-up interrupt pulses multiplied by the IAQ. To determine the MQ, the output signals of the metering encoder 48 on line 49 are counted in encoder signal, incremental to parallel, converter 68. The accumulated or decremented (direction) encoder_count signal is read by the microcontroller 52 as a 16-bit unsigned integer signal on line 69, referred to as the "Encoder Position" signal. Since the Encoder Position signal integer contains only 16 bits, further processing is required to convert it to 32 bits. Otherwise, the 16-bit counter would fill and overflow in the course of the advancement of lengths of film 10 expected to be transported through the film preparation work station. The following process is employed:

encoder_difference=encoder_position−last_encoder_position last_encoder_position=encoder_position encoder_count=encoder_count+encoder_difference metered_quantity=encoder_count (7)

In this manner, the "metered_quantity" is defined as the encoder_count and supplied to the microcontroller 52. To convert the 32-bit "metered_quantity" to the value required for determining the supply reel web winding radius Rs, the following equation is used:

$$MQ=(2\pi\ Rm/8192)*\text{metered\_quantity; or} \tag{8}$$

$$MQ=IAQ*\text{ metered\_quantity}$$

In a preferred embodiment, the metering capstan roller radius Rm is 0.63 inches, and so:

$$IAQ=2\pi\ (0.63/8192)=1/1303.79;$$

and $$MQ=\text{metered\_quantity}/1303.79 \tag{9}$$

The Supply Quantity (SQ) at each successive Supply Interrupt (SI) event and the radius Rs of the supply web or film winding on supply reel 22 may be determined from the Supply Web Circumference (SWC) in the following relationships:

$$SQ(n)=MQ@SI\text{ event }(n), \tag{10}$$

$$SQ(n+1)=MQ@SI\text{ event }(n+1), \tag{11}$$

$$SWC=SQ(n+1)-SQ(n),\text{ and} \tag{12}$$

$$Rs=SWC/2\pi. \tag{13}$$

In the same fashion, the radius Rt of the take-up web or film winding on take-up reel 32 may be determined from the Take-up Web Circumference (TWC) in the following relationships:

$$TQ(n)=MQ@TI\text{ event }(n) \tag{14}$$

$$TQ(n+1)=MQ@TI\text{ event }(n+1) \tag{15}$$

$$TWC=TQ(n+1)-TQ(n) \tag{16}$$

$$Rt=TWC/2\pi \tag{17}$$

From equations (4) and (5) above, the required supply and take-up reel torques Ts and Tt can now be determined from the respective web winding radii Rs and Rt and the assumed values for Fs and Ft:

$$Ts=Fs/Rs=Kt*Is\text{ or} \tag{18}$$

$$Is=(Fs/Rs)/Kt=Ts/Kt \tag{19}$$

where Is=the Supply Motor Current to be determined and Kt=30 oz-in/amp motor torque constant in a preferred embodiment. Similarly:

$$Tt=Ft/Rt=Kt*It\text{ or} \tag{20}$$

$$It=(Ft/Rt)/Kt=Tt/Kt \tag{21}$$

where It=Take-up Motor current to be determined and Kt=30 oz-in/amp motor torque constant in a preferred embodiment.

In a preferred embodiment, the gains of the supply and take-up motor current amplifiers 29 and 39 are set to 0.5 amps/volt. The required voltage into the amplifiers 29, 30 scales the above equations as shown below:

$$Ts=0.5*Kt*Vs, \tag{22}$$

where Vs=Supply Motor control signal, and $$Tt=0.5*Kt*Vt, \tag{23}$$

where Vt=Take-up Motor control signal

The supply and take-up motor torque signal voltages are derived from the 12-bit D/A converters 62 and 64. The scaling factor for each D/A converter 62, 64 is 20 volts/4096 in a preferred embodiment. Therefore the following microcontroller expressions are defined:

$$Ts=0.5*Kt*20/4096*\text{ Supply\_dtoa}=(0.073242\text{ oz-in) *Supply\_dtoa, and} \tag{24}$$

$$Tt=0.5*Kt*20/4096*\text{Take-up\_dtoa}=(0.073242\text{ oz-in) * Take-up\_dtoa.} \tag{25}$$

Solving for the Supply_dtoa and Take-up_dtoa word values:

$$\text{Supply\_dtoa}=Rs*Fs/0.073242,\text{ and} \tag{26}$$

$$\text{Take-up\_dtoa}=Rt*Ft/0.073242 \tag{27}$$

The digital words of the calculated supply and take-up motor torque signals applied to the supply and take-up D/A converters 62 and 64 therefore replace the default values supplied during TENSING. The calculation is updated once per revolution of the supply and take-up reels during the AT_SPEED and POSITIONING states.

At this point, it will be recalled that during TENSING with unknown actual take-up and supply reel radii, the default torque signal voltages Tts and Tss are calculated and converted using the default radii Rtd and Rsd using the relationships (18)–(27). The default digital supply and take-up motor torque signals are calculated once for the specific upstream and downstream drags that are measured or assumed in respect to the particular upstream and downstream devices 12 and 14. The calculations of the default digital words Supply_dtoa and Take-up_dtoa from these assumed or measured parameters are stored in RAM and called up for use during the TENSING state for the particular reel sizes. The TENSING state for the largest reel continues until one complete rotation after the ramped up film velocity is achieved. Then, the actual digital words are calculated and substituted. The substitution may be incremental until achieved. Furthermore, it is at this point that the state is considered to be TENSIONED.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–6 film 10
upstream and downstream drag imposing devices 12, 14
supply reel drive assembly 20
supply reel 22
supply reel torque motor 24
supply idler 25
supply reel encoder 26
supply encoder interrupt 27
supply motor current amplifier 28
supply motor torque signal line 29
take-up reel drive assembly 30
take-up reel 32
take-up reel torque motor 34
take-up idler 35
take-up encoder 36
take-up encoder interrupt 37
take-up motor current amplifier 38
take-up motor torque signal line 39
metering drive assembly 40
metering capstan roller 42
pinch roller 44
line 45
metering drive current motor 46
motor current amplifier 47
metering encoder 48
metering signal line 49
motion control electronics assembly 50
microcontroller 52
control bus 53
RAM 54
address bus 55
ROM 56
interrupt bus 57
command and status serial interface 58
data bus 59
supply motor D/A converter 60
take-up motor D/A converter 62
metering motor D/A converter 66
encoder signal incremental to parallel converter 68
encoder position signal line 69
tach signal A/D converter 72
film motion control servo diagram 100
servo loops 102, 106
blocks 104, 108–124
work station 132
supply and take-up reels 142 and 144
spliced roll 146
straight line path 148
reverse roll 150
metering roller 152
capstan 154
splice/perforation detector 156
film cleaner 158
electronic scanning devices 160, 162 and 164
second splice detector 166

What is claimed is:

1. In a film preparation workstation for advancing photographic film in a film transport path between a supply reel having a supply quantity of film wound thereon and a take-up reel having a take-up quantity of film wound thereon at a constant reference velocity in either a forward or rewind direction of advancement past one or more read and write magnetic head assemblies in intimate contact with a magnetic layer on the film and imposing drag thereon, the workstation further comprising:

metering means responsive to a metering drive signal defining a forward or rewind direction of advancement for engaging the film in the film transport path and advancing the film between said supply reel and said take-up reel at a film velocity;

a metering encoder for providing metering encoder signals representing incremental advancement of the film with respect to the metering means;

a supply reel torque motor coupled to the supply reel and responsive to a supply motor torque signal for applying a supply reel torque thereto to impart a supply reel tension on the film extending between the supply reel and the metering means dependent on the magnitude of the supply reel motor torque signal and the supply quantity;

a supply reel encoder for providing a supply interrupt signal at least once during each full rotation of the supply reel;

a take-up reel torque motor coupled to the take-up reel and responsive to a take-up motor torque signal for applying a take-up reel torque thereto to impart a take-up reel tension on the film extending between the take-up reel and the metering means dependent on the magnitude of the take-up reel motor torque signal and the take-up quantity; and a take-up reel encoder for providing a take-up interrupt signal at least once during each full rotation of the take-up reel;

the method of accelerating the film in a selected direction of forward or rewind advancement from a stopped state, wherein the film in the film transport path is stationary and the actual supply quantity and actual take-up quantity are unknown in the stopped state, to an at speed state in a velocity mode or a position mode, wherein the film speed is at the reference velocity and the supply quantity and take-up quantity are determined, comprising the steps of:

(a) disabling said metering means for allowing the film to be threaded in said film transport path;

(b) after threading of the film in the transport path, providing starting motor drive signals to said supply reel torque motor and said take-up reel torque motor to generate starting supply and take-up reel torques to said supply and take-up reels, respectively, to pre-tension said film sufficiently to take up slack in the film;

(c) during step (b) providing a metering drive signal to said metering means to counter the tendency of the film to move under the influence of the starting motor drive signals to thereby hold the metering means and film stopped;

(d) then, incrementing the magnitudes of said starting motor drive signals to said supply reel torque motor and said take-up reel torque motor to default motor drive signals dependent on the selected direction of advancement, the default supply reel torque motor drive signal magnitude correlated to a default supply quantity and the default take-up reel torque motor drive signal correlated to a default take-up quantity;

(e) upon incrementing of the starting motor drive signals to the default motor drive signals, providing a metering drive signal that is effective to advance the film in a selected forward or rewind direction of advancement in the transport path at a predetermined rate of acceleration for accelerating the film to the reference velocity;

(f) during film advancement, calculating the actual supply and take-up quantities from the supply and take-up interrupt signals and the metering encoder signals;

(g) calculating supply and take-up motor torque signals correlated to the actual supply and take-up quantities calculated in step (f), respectively, for equalizing tension in the film through the film transport path and advancing the film in the selected direction of advancement at the reference velocity; and (h) then, applying the calculated supply and take-up motor torque signals to the supply and take-up reel torque motors, respectively, in substitution for the default motor torque signals.

2. The method of claim 1 further comprising the steps of:

(i) deriving a film velocity related signal from the metering encoder signals; and (j) adjusting the metering drive signal as a function of the reference velocity and the derived film velocity related signal.

3. The method of claim 2 operable in the position mode for advancing the film to a desired start position from any current position comprising the steps of:

prior to step (e),
providing a position offset count of metering encoder signals governing a distance that the film is to be advanced; and
determining a threshold offset count of encoder signals less than said position offset count; and from step (e),
counting metering encoder signals;
comparing the count of metering encoder signals to said threshold offset count; and
when the count of metering encoder signals reaches the threshold offset count, providing a metering drive signal of incrementally decreasing magnitude for advancing said film in the selected forward or rewind direction of advancement in said transport path at a predetermined rate of deceleration for decelerating the film to zero velocity when the count of metering encoder signals reaches the position offset count.

4. The method of claim 1 operable in the position mode for advancing the film to a desired start position from any current position comprising the steps of:

prior to step (e),
providing a position offset count of metering encoder signals governing a distance that the film is to be advanced; and
determining a threshold offset count of encoder signals less than said position offset count; and from step (e),
counting metering encoder signals;
comparing the count of metering encoder signals to said threshold offset count; and
when the count of metering encoder signals reaches the threshold offset count, providing a metering drive signal of incrementally decreasing magnitude for advancing said film in the selected forward or rewind direction of advancement in said transport path at a predetermined rate of deceleration for decelerating the film to zero velocity when the count of metering encoder signals reaches the position offset count.

5. In a film preparation workstation for advancing photographic film in a film transport path between a supply reel having a supply quantity of film wound thereon and a take-up reel having a take-up quantity of film wound thereon at a constant reference velocity in either a forward or rewind direction of advancement past one or more read and write magnetic head assemblies in intimate contact with a magnetic layer on the film and imposing drag thereon, the workstation further comprising:

metering means responsive to a metering drive signal defining a forward or rewind direction of advancement for engaging the film in the film transport path and advancing the film between said supply reel and said take-up reel at a film velocity;

a metering encoder for providing metering encoder signals representing incremental advancement of the film with respect to the metering means;

a supply reel torque motor coupled to the supply reel and responsive to a supply motor torque signal for applying a supply reel torque thereto to impart a supply reel tension on the film extending between the supply reel and the metering means dependent on the magnitude of the supply reel motor torque signal and the supply quantity;

a supply reel encoder for providing a supply interrupt signal at least once during each full rotation of the supply reel;

a take-up reel torque motor coupled to the take-up reel and responsive to a take-up motor torque signal for applying a take-up reel torque thereto to impart a take-up reel tension on the film extending between the take-up reel and the metering means dependent on the magnitude of the take-up reel motor torque signal and the take-up quantity; and a take-up reel encoder for providing a take-up interrupt signal at least once during each full rotation of the take-up reel;

a system for accelerating the film in a selected direction of forward or rewind advancement from a stopped state, wherein the film in the film transport path is stationary and the actual supply quantity and actual take-up quantity are unknown in the stopped state, to an at speed state in a velocity mode or a position mode, wherein the film speed is at the reference velocity and the supply quantity and take-up quantity are determined, comprising:

means for disabling said metering means for allowing the film to be threaded in said film transport path;

means operable after threading of the film in the film transport path for providing starting motor drive signals to said supply reel torque motor and said take-up reel torque motor to generate starting supply and take-up reel torques to said supply and take-up reels, respectively, to pre-tension said film sufficiently to take up slack in the film and for then incrementing the magnitudes of said starting motor drive signals to said supply reel torque motor and said take-up reel torque motor to default motor drive signals dependent on the selected direction of advancement, the default supply reel torque motor drive signal magnitude correlated to a default supply quantity and the default take-up reel torque motor drive signal correlated to a default take-up quantity;

means for providing a metering drive signal to said metering means to counter the tendency of the film to move under the influence of the starting motor drive signals to thereby hold the metering means and film stopped;

means operable upon incrementing of the starting motor drive signals to the default motor drive signals, for providing a metering drive signal that is effective to advance the film in a selected forward or rewind direction of advancement in the transport path at a predetermined rate of acceleration for accelerating the film to the reference velocity;

means operable on achievement of the at speed state for calculating the actual supply and take-up quantities from the supply and take-up interrupt signals and the metering encoder signals;

means for calculating supply and take-up motor torque signals correlated to the calculated actual supply and take-up quantities, respectively, for equalizing tension in the film through the film transport path and advancing the film in the selected direction of advancement at the reference velocity; and means for applying the calculated supply and take-up motor torque signals to the supply and take-up reel torque motors, respectively, in substitution for the default motor torque signals.

6. The system of claim 5 further comprising:

means for deriving a film velocity related signal from the metering encoder signals; and means for adjusting the metering drive signal as a function of the reference velocity and the derived film velocity related signal.

7. The system of claim 6 operable in the position mode for advancing the film to a desired start position from any current position further comprising:

means for providing a position offset count of metering encoder signals governing a distance that the film is to be advanced; and means for determining a threshold offset count of encoder signals less than said position offset count;

means for counting metering encoder signals;

means for comparing the count of metering encoder signals to said threshold offset count; and means operable when the count of metering encoder signals reaches the threshold offset count for providing a metering drive signal of incrementally decreasing magnitude for advancing said film in the selected forward or rewind direction of advancement in said transport path at a predetermined rate of deceleration for decelerating the film to zero velocity when the count of metering encoder signals reaches the position offset count.

8. The system of claim 5 operable in the position mode for advancing the film to a desired start position from any current position further comprising:

means for providing a position offset count of metering encoder signals governing a distance that the film is to be advanced; and means for determining a threshold offset count of encoder signals less than said position offset count;

means for counting metering encoder signals;

means for comparing the count of metering encoder signals to said threshold offset count; and means operable when the count of metering encoder signals reaches the threshold offset count for providing a metering drive signal of incrementally decreasing magnitude for advancing said film in the selected forward or rewind direction of advancement in said transport path at a predetermined rate of deceleration for decelerating the film to zero velocity when the count of metering encoder signals reaches the position offset count.

9. The apparatus of claim 5 wherein:

said default supply quantity is selected as a function of twice the smallest hub radius of the supply reels expected to be used in the system; and said default take-up quantity is selected as a function of the largest hub of any take-up reel radius expected to be used in the system.

* * * * *